(12) United States Patent
Lee

(10) Patent No.: US 9,387,932 B2
(45) Date of Patent: Jul. 12, 2016

(54) PANEL INSERTS FOR AIRCRAFT AND OTHER VESSELS

(75) Inventor: Thomas M. Lee, Coto de Caza, CA (US)

(73) Assignee: Driessen Aircraft Interior Systems, Inc., Huntington Beach, CA (US)

( * ) Notice: Subject to any disclaimer, the term of this patent is extended or adjusted under 35 U.S.C. 154(b) by 135 days.

(21) Appl. No.: 12/901,054

(22) Filed: Oct. 8, 2010

(65) Prior Publication Data

US 2011/0084164 A1    Apr. 14, 2011

Related U.S. Application Data

(60) Provisional application No. 61/278,745, filed on Oct. 9, 2009.

(51) Int. Cl.
| | | |
|---|---|---|
| *B64D 11/00* | (2006.01) | |
| *B64D 11/04* | (2006.01) | |
| *B32B 38/00* | (2006.01) | |

(52) U.S. Cl.
CPC .............. *B64D 11/04* (2013.01); *B32B 38/145* (2013.01); *B32B 2605/18* (2013.01); *B32B 2607/00* (2013.01); *Y10T 428/24008* (2015.01)

(58) Field of Classification Search
CPC .............. B32B 38/145; B32B 2605/18; B32B 2607/00; Y10T 428/24008; B64D 11/04
USPC ...................... 244/118.5; 40/584, 603; 428/99
See application file for complete search history.

(56) References Cited

U.S. PATENT DOCUMENTS

| | | | |
|---|---|---|---|
| 3,102,314 A | | 9/1963 | Alderfer |
| 3,673,720 A | * | 7/1972 | Thornton ........................ 40/601 |
| 3,802,103 A | * | 4/1974 | Neff ................................. 40/591 |
| 4,618,118 A | * | 10/1986 | Nardella et al. .............. 248/243 |
| 4,650,103 A | | 3/1987 | Mitchell |
| 4,804,572 A | | 2/1989 | Bodrogi |
| 4,809,454 A | | 3/1989 | Weisman |
| 5,148,618 A | | 9/1992 | Brewster |
| 5,158,346 A | | 10/1992 | Marks et al. |
| 5,165,526 A | | 11/1992 | Conklin, Jr. |

(Continued)

FOREIGN PATENT DOCUMENTS

| | | |
|---|---|---|
| CH | 692229 | 3/2002 |
| CN | 2583761 | 10/2003 |

(Continued)

OTHER PUBLICATIONS

International Search Report and Written Opinion dated Jun. 17, 2011 in related Application No. PCT/US2010/052002.

(Continued)

*Primary Examiner* — Brian M O'Hara
*Assistant Examiner* — Assres H Woldemaryam
(74) *Attorney, Agent, or Firm* — Kilpatrick Townsend & Stockton LLP; Kristin M. Crall; Dean W. Russell

(57) ABSTRACT

Embodiments of the present invention provide a system that provides a cohesive, harmonized look to aircraft galleys and other aircraft areas. The system allows airlines to easily change the decorative front fascia of galley (and other) airline components, even while the components are installed on the aircraft. The replacement is accomplished without the use of tools or extensive manual effort by providing replaceable and interchangeable panels for use on aircraft or other passenger transport vehicles or vessels.

14 Claims, 5 Drawing Sheets

(56) References Cited

U.S. PATENT DOCUMENTS

| | | | |
|---|---|---|---|
| 5,244,080 A | 9/1993 | Bierbaum | |
| 5,280,831 A | 1/1994 | Conklin, Jr. | |
| 5,330,044 A | 7/1994 | Conklin, Jr. | |
| 5,415,451 A * | 5/1995 | Stanton | 296/21 |
| 5,427,227 A | 6/1995 | Crandall et al. | |
| 5,507,109 A * | 4/1996 | Rinzler | 40/603 |
| 5,649,730 A * | 7/1997 | Ramos | 296/21 |
| 5,657,566 A * | 8/1997 | Key | 40/590 |
| 5,664,354 A * | 9/1997 | Daviau et al. | 40/603 |
| 5,761,839 A | 6/1998 | Heikkila | |
| 5,806,942 A | 9/1998 | Jenkins, Jr. et al. | |
| 5,941,002 A * | 8/1999 | Rusin | 40/611.06 |
| 6,036,250 A * | 3/2000 | Glatter | 296/21 |
| 6,055,754 A * | 5/2000 | Melhuus | 40/601 |
| 6,073,375 A | 6/2000 | Fant et al. | |
| 6,086,174 A | 7/2000 | Graves et al. | |
| 6,116,167 A | 9/2000 | Rabe | |
| 6,126,112 A | 10/2000 | Apel et al. | |
| 6,305,111 B1 * | 10/2001 | Opdahl | 40/603 |
| 6,601,913 B2 | 8/2003 | Romca et al. | |
| 6,706,373 B2 | 3/2004 | Corn et al. | |
| 6,769,726 B1 * | 8/2004 | Clark | 296/21 |
| 6,809,921 B2 * | 10/2004 | Wu et al. | 361/679.56 |
| 6,826,861 B2 * | 12/2004 | Alexander et al. | 40/601 |
| 6,883,260 B1 | 4/2005 | Cobb et al. | |
| 6,971,147 B2 | 12/2005 | Halstead | |
| 7,104,599 B2 | 9/2006 | Berger et al. | |
| 7,109,885 B1 * | 9/2006 | Denlinger | 340/908 |
| 7,143,535 B1 | 12/2006 | Cobb et al. | |
| 7,325,343 B2 * | 2/2008 | Seiber et al. | 40/606.02 |
| 7,621,593 B2 | 11/2009 | Dickinson | |
| 7,843,295 B2 | 11/2010 | Fullerton et al. | |
| 7,987,622 B2 * | 8/2011 | Pitt et al. | 40/603 |
| 8,037,629 B2 * | 10/2011 | Harris | 40/594 |
| 8,037,631 B2 * | 10/2011 | Harris | 40/662 |
| 8,111,208 B2 * | 2/2012 | Brown | 345/1.3 |
| 2002/0066393 A1 | 6/2002 | Strode et al. | |
| 2002/0109604 A1 | 8/2002 | Martin | |
| 2002/0194760 A1 * | 12/2002 | Wittenberg | 40/603 |
| 2003/0000901 A1 * | 1/2003 | Salatin et al. | 211/85.16 |
| 2003/0160009 A1 * | 8/2003 | Wells et al. | 211/13.1 |
| 2004/0003525 A1 * | 1/2004 | Daryabagi et al. | 40/584 |
| 2005/0005544 A1 * | 1/2005 | Borowiecki et al. | 52/204.5 |
| 2005/0052516 A1 | 3/2005 | Wilde et al. | |
| 2005/0166431 A1 * | 8/2005 | Boron et al. | 40/607.03 |
| 2005/0166435 A1 | 8/2005 | Lackey et al. | |
| 2005/0188571 A1 * | 9/2005 | Wilson | 40/601 |
| 2005/0252053 A1 * | 11/2005 | Pena | 40/591 |
| 2006/0070282 A1 * | 4/2006 | Craig et al. | 40/590 |
| 2006/0118676 A1 * | 6/2006 | Novak et al. | 244/129.1 |
| 2006/0145002 A1 * | 7/2006 | Van Loon | A47B 51/00 244/118.1 |
| 2006/0181105 A1 | 8/2006 | Puschmann | |
| 2006/0219693 A1 | 10/2006 | Earls et al. | |
| 2006/0230657 A1 | 10/2006 | Kotze | |
| 2006/0254101 A1 | 11/2006 | Callison et al. | |
| 2006/0260162 A1 | 11/2006 | Ballinger | |
| 2006/0277807 A1 | 12/2006 | Wilde et al. | |
| 2007/0056231 A1 * | 3/2007 | DiMario et al. | 52/204.53 |
| 2007/0107277 A1 | 5/2007 | Simms et al. | |
| 2007/0182181 A1 * | 8/2007 | Cohen et al. | 296/21 |
| 2007/0279314 A1 | 12/2007 | Brown | |
| 2008/0000399 A1 | 1/2008 | Herbert et al. | |
| 2008/0148613 A1 * | 6/2008 | Lefebvre | 40/601 |
| 2008/0148615 A1 | 6/2008 | Mileski | |
| 2008/0186683 A1 | 8/2008 | Ligtenberg et al. | |
| 2008/0216368 A1 * | 9/2008 | Delamere | 40/590 |
| 2008/0284983 A1 * | 11/2008 | Dula | 352/131 |
| 2009/0007517 A1 * | 1/2009 | Swanson | 52/543 |
| 2009/0224103 A1 | 9/2009 | Neumann et al. | |
| 2009/0249664 A1 * | 10/2009 | Golle | 40/446 |
| 2009/0250574 A1 | 10/2009 | Fullerton et al. | |
| 2009/0322125 A1 | 12/2009 | Berger et al. | |
| 2010/0011641 A1 * | 1/2010 | Hill | 40/606.12 |
| 2012/0113364 A1 * | 5/2012 | Hsueh et al. | 349/106 |

FOREIGN PATENT DOCUMENTS

| | | | |
|---|---|---|---|
| CN | 2850424 | 12/2006 | |
| CN | 200944295 | 9/2007 | |
| CN | 201069636 | 6/2008 | |
| DE | 102005043610 | 3/2007 | |
| EP | 0819404 | 1/1998 | |
| EP | 0922413 | 6/1999 | |
| EP | 0922413 * | 4/2003 | A47B 31/00 |
| EP | 1376518 A2 | 1/2004 | |
| EP | 1529482 | 5/2005 | |
| EP | 1591040 | 11/2005 | |
| EP | 0922413 * | 4/2013 | A47B 31/00 |
| FR | 2677791 | 12/1992 | |
| GB | 2298673 | 9/1996 | |
| GB | 2321757 | 8/1998 | |
| GB | 2391102 | 1/2004 | |
| GB | 2421473 | 6/2006 | |
| GB | 2437612 | 10/2007 | |
| IE | 20080182 | 9/2008 | |
| JP | 2001204553 | 7/2001 | |
| JP | 2002196712 | 7/2002 | |
| NL | 1002515 * | 9/1997 | B62B 3/02 |
| WO | WO-9113426 | 9/1991 | |
| WO | WO-9904381 | 1/1999 | |
| WO | WO-9956268 | 11/1999 | |
| WO | WO-0159744 | 8/2001 | |
| WO | WO-02073574 | 9/2002 | |
| WO | WO-03009586 | 1/2003 | |
| WO | WO-2005015527 | 2/2005 | |
| WO | WO-2006104575 | 10/2006 | |
| WO | WO-2007121766 | 11/2007 | |
| WO | WO-2008111033 | 9/2008 | |

OTHER PUBLICATIONS

Office Action dated Dec. 13, 2012 in U.S. Appl. No. 13/112,397.
International Search Report dated Feb. 13, 2014 in Application No. PCT/US2012/035920.
International Preliminary Report on Patentability dated Mar. 6, 2014 in Application No. PCT/US2012/035920.
Office Action dated Feb. 13, 2014 in U.S. Appl. No. 13/112,397.
Non-Final Office Action dated Jul. 19, 2013 for U.S. Appl. No. 13/112,397, 11 pages.
U.S. Appl. No. 13/112,397, Non-Final Office Action dated Apr. 9, 2015.
U.S. Appl. No. 13/112,397, Final Office Action dated Sep. 12, 2014.

* cited by examiner

PANEL INSERTS FOR AIRCRAFT AND OTHER VESSELS

This application claims the benefit of U.S. Provisional Application Ser. No. 61/278,745, filed Oct. 9, 2009 titled "Easily-Changed Panels for Galley Inserts in Aircraft or Other Vessels," the entire contents of which are hereby incorporated by reference.

FIELD OF THE INVENTION

Embodiments of the present invention relate generally to panel inserts for aircraft that can be easily changed, as well as components on the aircraft that are specifically designed to receive and cooperate with such panel inserts. Particular embodiments are designed for use in aircraft galleys and other locations on an aircraft or other passenger transport vehicle or vessel.

BACKGROUND

A number of food service and other components/hardware items are located in an aircraft galley. For example, an aircraft galley typically includes at least a water boiler, a beverage/food chiller, an oven, and a trash compactor. It may also include a coffee maker, storage cabinets or closets, trolleys/food service carts, and a number of other service and storage items/areas.

Traditionally, galley equipment has a single paint color or decorative laminate affixed to the front surface that faces that galley work area. The surface is intended to be generally neutral or to match the color of other decorative materials in the area. Once such equipment is installed, changing the colors or laminate materials is expensive and usually requires re-certifying the entire component with appropriate authorities or airframe manufacturers.

As airlines are moving more toward an integrated design approach in their galleys (as well as other areas on the aircraft), it is desirable that the galley components present a unified and harmonized look and feel. For example, if the door panels of all of the components have a similar color or finish, similar design, a unified graphic design, or an otherwise clean and uncluttered look, then the galley is much more visually appealing to travelers and airline attendants than if the door panels are a hodge-podge of colors and designs. Additionally, components that are located in an aircraft galley may initially all be purchased from one supplier so that they have a cohesive look and feel, although it is more often the case that varying components are purchased from a number of separate suppliers. This may result in the galley having a disjointed look and feel, which prevents the airline from projecting a unified and cohesive look in the galley area.

Moreover, even if the component door panels initially present a unified look (e.g., a similar color scheme or décor) when installed, over time, they may become scratched, dented, gummed with stickers or sticky notes (used to identify the food items located inside the component), marred, or otherwise damaged. This results in a galley that appears messy and unkempt. Travelers often pass by and through the galley areas. Thus, presenting a unified, uncluttered, and elegant look to the galley helps the airline project a professional and calming atmosphere. Damage to component door panels can interfere with this goal.

The present inventors have also identified a separate need, wherein airlines may wish to replace component doors that are not necessarily damaged, but to provide artwork, a billboard effect, decorative items, graphics, promotional, "white board" (easily erasable, marking board), or other functional or ornamental indicia across the galley area. These options are described in more detail below.

In the past, replacement of component panel doors has entailed removing the entire component (the oven, the chiller, or so forth) and installing a completely new component or unit. This can be expensive, wasteful, and time-consuming. Alternatively, just the door of the particular component may be removed and replaced, which is also expensive and time-consuming. A further option has been to non-removeably adhere (glue, bolt, or otherwise permanently secure) a separate, new panel to the component door. All of these options are expensive and time-consuming, requiring tools, downtime of the aircraft, and skilled maintenance personnel in order to effect the replacement or change. In short, these options are not optimal ways to achieve the desired results.

Another challenge that arises when components on an aircraft are replaced is that each and every time a part is changed or installed on the aircraft, it must receive a new part number and be independently Federal Aviation Administration (FAA) certified. This is in part to ensure that the parts meet non-flammability, smoke, and other FAA requirements. This additional certification can be expensive and time-consuming. There is thus a need for an improved system for replacing component door panels on aircraft and other passenger transport vehicles or vessels.

BRIEF SUMMARY

Airlines may wish to refresh the look of their galleys or other cabin areas from time to time. With the current approach to decorative finishes and laminates on galley components, the entire unit (or at least the door of the unit) would need to be upgraded or replaced. This typically requires wholly new certification of the entire galley component equipment. Accordingly, the present inventors have developed a system that provides a cohesive, harmonized look to aircraft galleys and other aircraft areas. The system allows airlines to easily change the decorative front fascia of galley (and other) airline components, even while the components are installed on the aircraft. The replacement is accomplished without the use of tools or extensive manual effort by providing replaceable and interchangeable panels for use on aircraft. The panel system also helps enhance the aesthetic value of the aircraft cabin and galley environment. Just the decorative or aesthetic quality finish may be replaced from unit to unit (or from door to door or from panel to panel), and the airline may select from a family of panel insert designs.

For example, embodiments described allow the airline to quickly and easily change panel inserts so that they match collectively across an entire galley or other area. Alternative embodiments allow the airline to display significantly larger advertising, logos, or other large surface area designs across an entire galley in order to achieve a billboard effect, rather than be restricted to designs on a single component. If a galley component is broken and needs to be removed from the aircraft, the panel insert may be quickly and easily transferred from the broken component to the replacement component, without having an unmatching component in the interim. Alternatively, the airline may simply wish to refurbish all component doors with a different color or design, and do so without extreme expense, down-time or regulatory considerations. At least one embodiment of the system described herein thus provides the option of a single certification step, wherein the system or family of panel inserts is initially certified, such that once installed, the entire component does not need to be re-qualified or certified.

DETAILED DESCRIPTION

Embodiments of the present invention provide a system of airline component door panel inserts that provide a cohesive, harmonized look to aircraft galleys and other aircraft areas. It may often be the case that damaged component doors need to be replaced, but airlines may also wish to use various embodiments described herein in order to provide a fresh new look to a galley area or other area on-board the aircraft. There is provided a system of easily-changeable panel inserts that may be removed, replaced, and interchanged relatively easily without specific tools or skilled maintenance personnel on the aircraft. The panel system helps enhance the aesthetic value of the aircraft cabin and galley environment. The system also provides the option of a single certification step, wherein the system of panel inserts is initially certified, and then, once installed, the component does not need to be re-certified.

Figure 1:
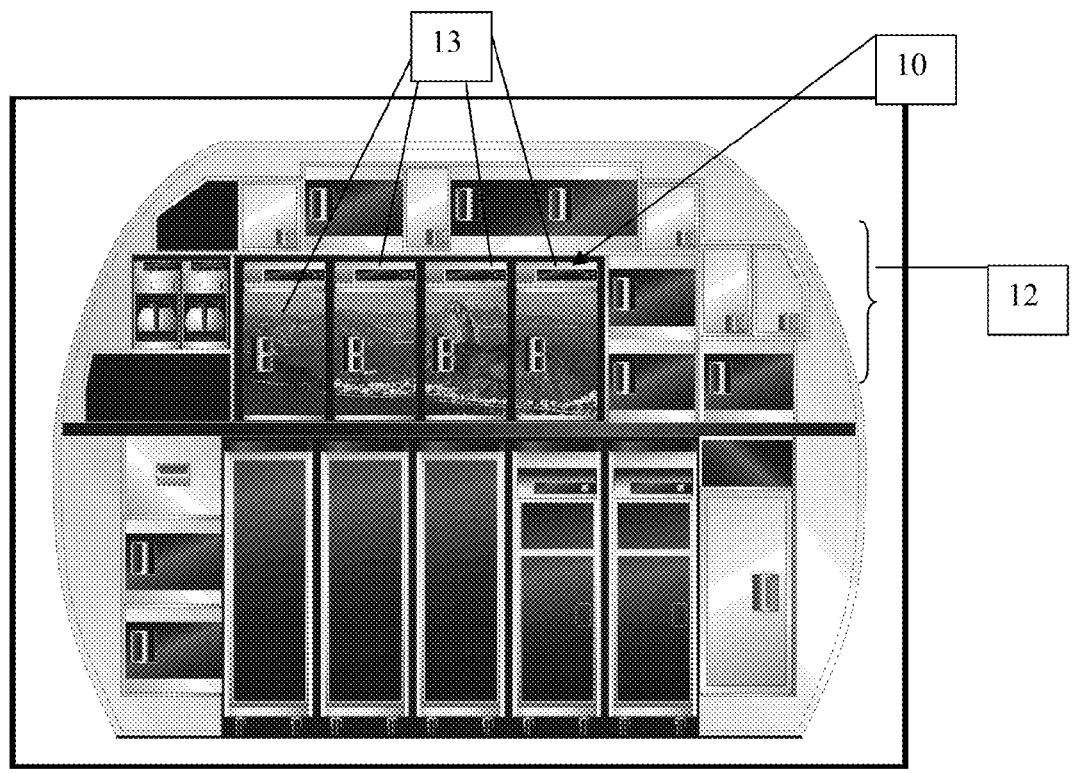
FIG. 1 shows a front plan view of an aircraft galley featuring one family of billboard panel inserts.
Figure 2:
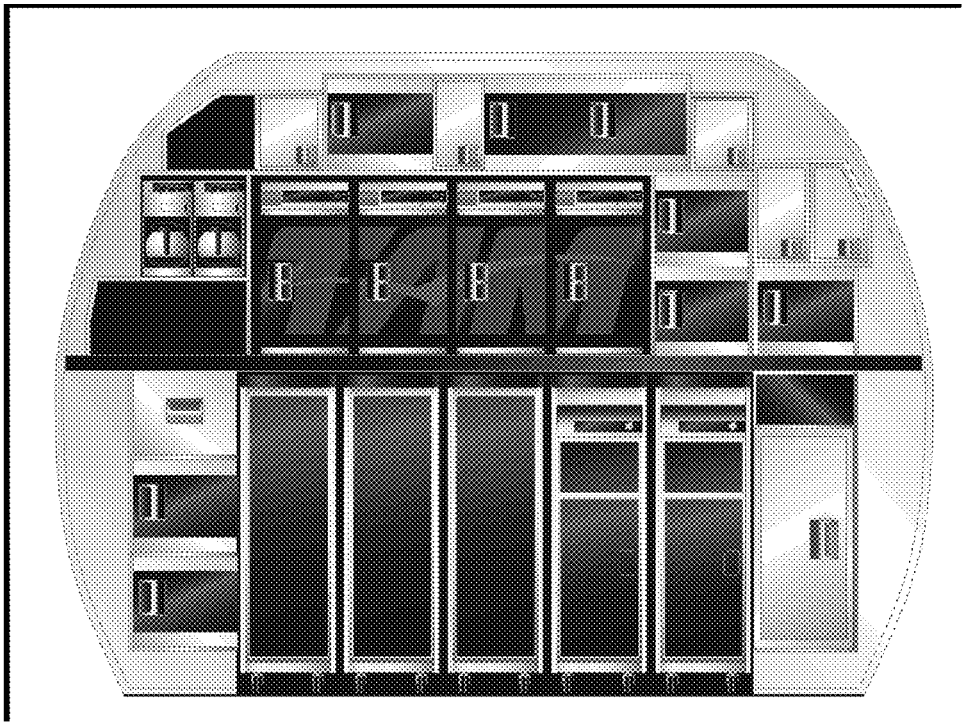
FIG. 2 shows a front plan view of an aircraft galley featuring an alternate family of billboard panel inserts.
Figure 3:
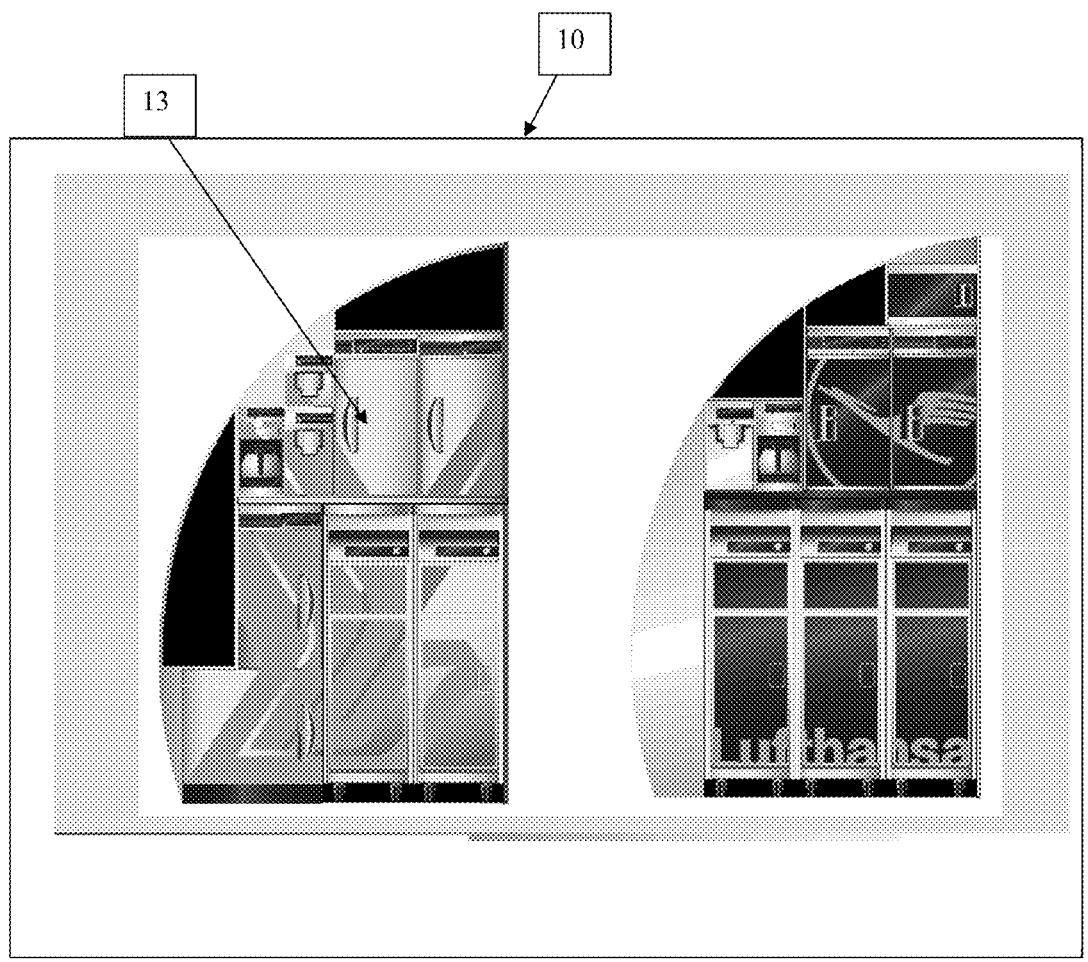
FIG. 3 shows a front plan view of an aircraft galley featuring a cohesive family of billboard panel inserts positioned on upper and lower components, and illustrates an example of how they may be interchanged.

As shown in FIGS. 1-3, various embodiments of the panel inserts 10 described herein may feature imprinted graphics, promotional indicia, decorative items, airline logos, advertisement material, artwork, visual indicia (including, for example, exit directional information), or any other design elements. In one embodiment, a family 12 of multiple panels 10 may each have a different design element or visual indicia or printed material (such as part of a photo, a letter, a logo, or any other feature) that collectively forms a billboard effect or a mural when positioned and viewed together. These panel inserts may be referred to as billboard panels 13, and this term is intended to refer to and include one or more panel insert(s) having any type of pattern, picture, text, printing, logo, photo, design, symbol, or any other visual indicia adhered to, printed on, or otherwise displayed by the panel insert.

For example, the family 12 of panels together may create a visually appealing scene, such as a photograph or picture of one of the destinations to which the airline travels, as shown in FIG. 1. Each panel may have a portion of the scene thereon, such that when installed or properly positioned, the panels collectively form a continuous visual effect, much like a mural. In another example shown in FIGS. 2 and 3, each panel has a portion of an airline name, airline logo, or other promotional item or service, such that when installed or properly positioned, the panels collectively form a desired, continuous visual effect.

Figure 4:
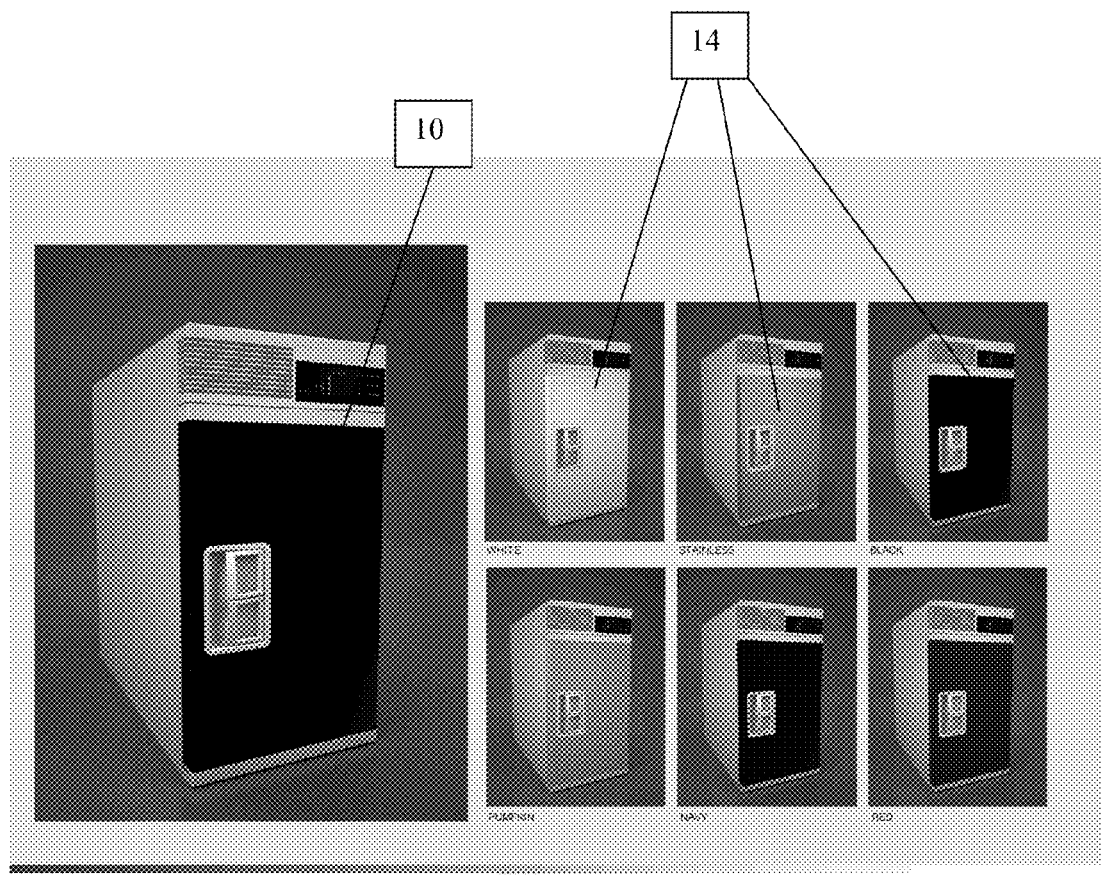
FIG. 4 shows a plurality of side perspective views of aircraft galley equipment components featuring single, replaceable, alternate colored panel inserts.

Other embodiments provide panel inserts that do not present a collective design, but that match a related color scheme or provide a generally muted design or pattern (rather than a series of graphics on two or more panels intended to be viewed as a billboard). These embodiments may be referred to as single panels 14. As such, single panels 14 do not need to be installed as part of a family of panels in order to be visually appealing, but can instead be installed individually and in no particular order. Examples of such features are shown in FIG. 4. Non-limiting examples include a stainless steel finish, a glossy or matte color finish, a fabric-type material, a wood-like or wood finish, laminate, vinyl, leather (real or faux), metals (e.g., aluminum), ceramics, plastics (e.g., polycarbonate), glass, bendable glass, whiteboard material, chalkboard finish, or any other appropriate material that would enhance the décor of an aircraft interior or provide a functional advantage or look over the currently-installed door panels. The panels may feature a single solid color, one or more colors, or an individual repeating pattern (e.g., stripes, dots, chevrons, triangles, or any other design). One example could be a leather-like or wood-like finish that may have a grain or a textured appearance, but does not necessarily feature graphics or textual indicia. Another example could be a repeating shape design. In short, the installation of such single panels 14 does not require any order or sequence in order to present a unified look.

Any and all of the above visual options for either a billboard panel 13 or a single panel 14 will collectively be referred to as an "aesthetic quality." In order to lower inventory and provide enhanced options, it is possible that each of the front and back surfaces of the panel insert may feature an aesthetic quality. In one example, a front surface of the panel features a solid color and the back surface features a portion of scenery or a logo. Airline personnel may desire to interchange one option for another quickly and easily.

Panel inserts 10 may be attached or otherwise secured to any appropriate cabin surface. Although installation and use is described throughout with a particular emphasis for use in an aircraft galley and on galley component doors, it should be understood that the panel inserts may be installed on any appropriate cabin surface. For example, the panel inserts may be secured to component door(s) anywhere on the aircraft (such as oven door, chiller door, trash compactor door, boiler door, or so forth), storage cabinet door(s), lavatory door(s), overhead compartment door(s), galley cart/trolley or other food service cart, coat closet door(s), cockpit door(s), divider panel(s), tray table(s), seat back(s), exit row panels(s), or any other appropriate aircraft surface. In short, instead of only replacing damaged panels, an airline may also desire to periodically change the doors of its galley components, its lavatory doors, its closet doors, or any other space in the cabin interior in order to provide a different look and feel of the galley or other airline areas. Any and all of these options will be collectively referred to as a "receiving surface." For example, the airline may wish to provide artwork, a billboard scenery effect, the airline name, logo, or other promotional indicia in the galley or anywhere on the aircraft. The airline may instead wish to a club-like feel and provide a leather or wood panel look, or it may wish to provide a contemporary modern feel and use a stainless finish in the galley or other airline areas.

Generally, the panel inserts are configured and designed to be removeably and releaseably secured or fixed to a receiving surface 16. Removal and replacement of the panel insert does not require any special tools. In a specific embodiment, the receiving surface 16 has a first securing mechanism 18 that is intended to cooperate with a second, corresponding securing mechanism 20 on the panel insert 10. The panel inserts 10 may be secured to the receiving surface 16 by cooperation between the first and second securing mechanisms, collectively referred to as a "securing system" 22. The panel inserts 10 are not adhesively bonded or otherwise permanently secured to the receiving surface 16, but instead, securing system 22 provides an easily-releasable and easily-changeable system for the panel inserts 10.

Figure 5:
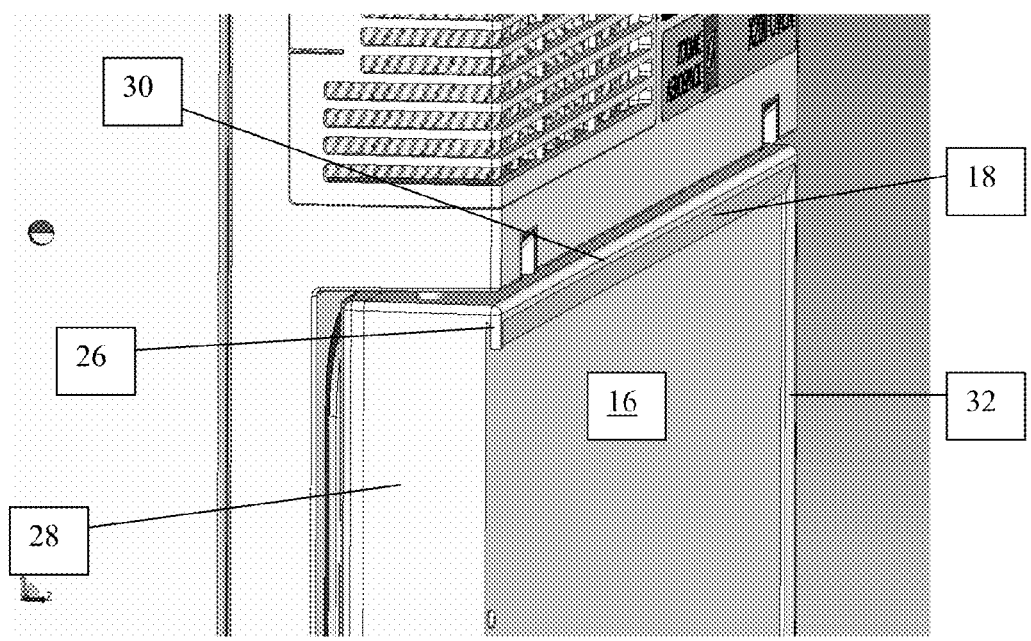
FIG. 5 shows a side perspective view of an aircraft galley equipment component door without having a panel insert positioned thereon.

In one embodiment, the securing system is a channel (or groove or slot) and edge cooperation. The panel insert 10 has one or more edges 24 that may slide into a slot, channel, pocket, or groove 26 on receiving surface. For example, as shown in FIG. 5, a galley component door 28 is shown as having a channel 26 along its top portion 30 and along one side edge 32. Channel may also be positioned along the bottom portion. Channel 26 may be formed as an overhang portion at the top of the receiving surface 16 (here, shown as a door 28), integral with the receiving surface, or it may be formed as a separate channel that is installed separately on receiving surface. Although not shown, channel 26 may alternatively be positioned along both sides and along the bottom of the receiving surface. Channel 26 may be continuously formed or it may simply be provided as a portion (e.g., a portion of a channel or of the door) positioned along receiving surface.

In use, edge 24 of panel insert 10 is slid into the channel 26. If channel 26 is positioned along the top, bottom, and one side edge of surface 16 as shown, then the panel insert edge 24 may be inserted from the opposite side edge (the side edge without the channel). If channel is positioned along both side edges and along the bottom of surface, then the panel insert edge 24 may be inserted from the top. Other insertion options, directions, and channel positions are also possible and considered within the scope of this invention.

Figure 6:
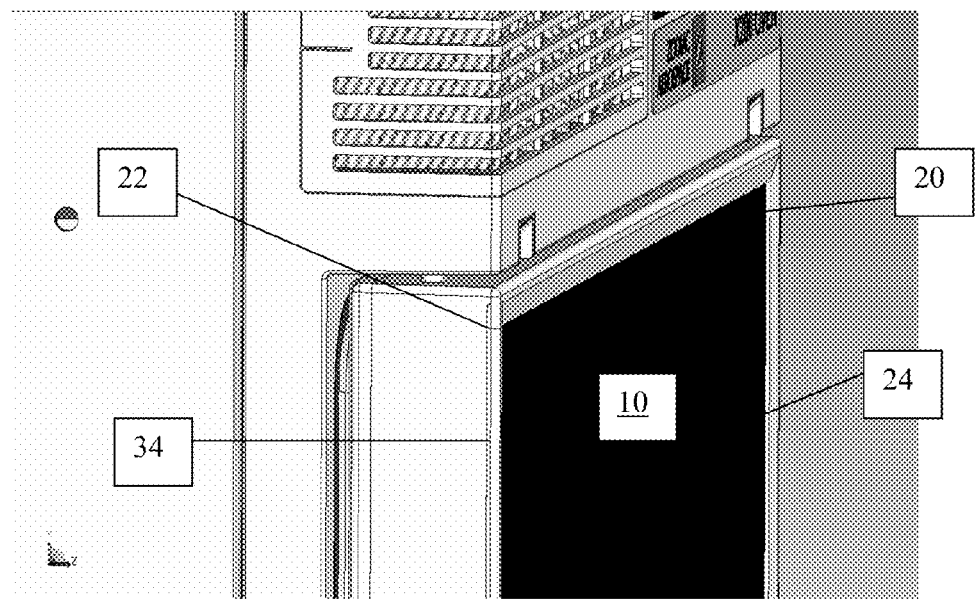
FIG. 6 shows a side perspective view of the aircraft galley equipment component door of FIG. 5 having a panel insert positioned thereon.
Figure 7:
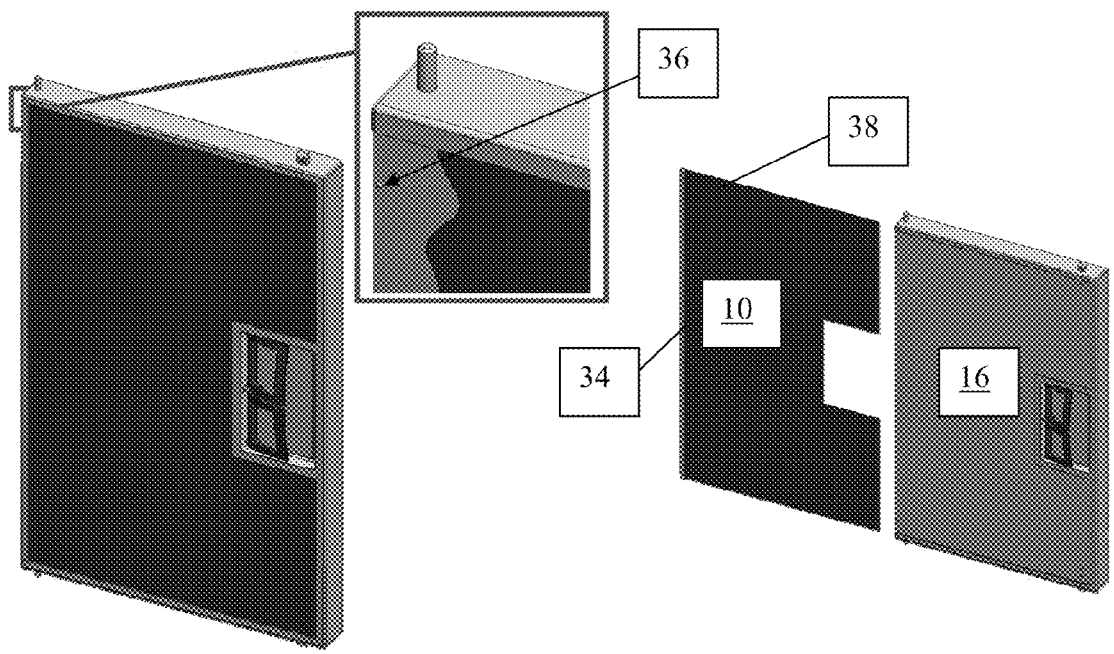
FIG. 7 shows one embodiment of a securing system for securing an insert panel.

One optional feature (particularly if the channel is provided as a separate channel portion) is a similarly-shaped trim edge 34. Trim edge may be provided as a strip that is similar in geometry or the same geometry as the other three edges, so that when it is installed, trim edge provides a "picture frame" look. Examples of trim edges 34 are shown in FIGS. 6 and 7. In one embodiment, trim edge is an approximately 0.06×0.3× 18" plastic strip attached to panel insert 10. Once installed, it may provide a continuous "picture frame" look around all four sides of the panel. It should be understood, however, that trim edge may be made of any appropriate material. One visually appealing effect is provided if the trim piece is of a similar material as the panel insert.

Upon insertion of the panel insert 10, the trim edge 34 may be removeably secured along the open edge where the panel was inserted in order to complete the look, as well as prevent inadvertent sliding of the panel insert. Trim edge 34 may snap onto the panel, be secured around the non-received panel edge (i.e., the edge that does not cooperate with the channel 26), it may be received in channel, or may be secured in any other appropriate manner.

The dimensions of channel may be any appropriate size, as long as it is slightly larger than the edge of panel, such that panel may slide into and be received in channel. In a specific embodiment, the width of the channel is about 0.030 inches and the thickness of the decorative panel is about 0.020 inches. These are provided as examples only and are not intended to limit this disclosure in any way. In another specific embodiment, the size of the panel insert is about 24 inches to about 24 inches, more particularly about 20 inches to about 20 inches, even more particularly about 17 to about 11 inches, and even more particularly about 17.6 inches to about 11.1 inches. It should be understood that the panel insert may be any appropriate dimension, however. For example, if used to cover a lavatory or cockpit door, it should accordingly be appropriately sized. Other dimensions and sizes can be understood and determined based on the intended use for panel insert.

In an alternate embodiment, the securing system is a bump (or raised protrusion) and recess cooperation. One of the panel insert 10 or the receiving surface 16 has a bump 36 and the other of the panel insert or the receiving surface has a recess 38. In use, the bump 36 mates with the recess 38. For example, as shown in FIG. 7, if the bump 36 is located on the receiving surface 16, it mates with a recess on the back of panel insert. If the bump is located on the pack of panel insert, it mates with a recess on receiving surface. This allows panel insert to easily snap onto and off of receiving surface without the use of specific tools.

Any other connection or securing systems may be used in conjunction with the embodiments described herein. Any system that will removeably or interchangeably secure the panel inserts to a aircraft receiving surface is considered within the scope of this invention. For example, the securing system may be a ball and detent system, a dove-tail connection, a J-lock system, a magnetic system, a snap system, a hinged system (wherein a panel insert can have one or more pegs that are inserted into holes resembling hinge elements on the receiving surface and swung closed) a clip system, hook and loop (e.g., Velcro™) or any other appropriate system.

Another feature provided is the ability to obtain a single certification for the panel inserts, such that once certified by the FAA, the panel inserts can be removed and replaced without additional re-certification for each part. In one proposed approach, the panel inserts are designated as trim to the component to which they are intended to be releaseably secured. The process includes certifying and qualifying a first a panel insert having one color or design, but then allowing that panel insert to be interchangeable with any number of second panel inserts from the family 12 without a new certification process. Thus, after an airline installs qualified and certified unit, component or piece of equipment, it is free to replace the panel inserts with any other panel insert in the family (e.g., a billboard panel 13 or a single panel 14 or any other option) having a different color or design without having to create a new unit part number and subsequently re-qualify or certify the unit, component or piece of equipment. In short, this option allows the fit, form, and function of the panel inserts to be pre-qualified with the FAA for the entire family of interchangeable panel inserts, without obtaining new parts numbers for each panel. Additionally, qualified and certified equipment may be shipped with a panel insert (showing a different design or color than the panel insert that went through the original certification) without having to obtain new part numbers. Materials, colors, dimensions, construction parameters, and any other parameter that must be qualified of certified for safety and other FAA reasons will all be certified initially and then panel inserts from the family will be easily replaceable without further regulatory efforts.

Changes and modifications, additions and deletions may be made to the structures and methods recited above and shown in the drawings without departing from the scope or spirit of the invention and the following claims.

What is claimed is:

1. A panel insert system for use on-board an aircraft, comprising:
   (a) an aircraft galley receiving surface comprising at least four edges, with a continuous channel positioned along at least three of the edges of the receiving surface, leaving at least one receiving surface edge without a channel for insertion and removal of a single panel insert;
   (b) a plurality of panel inserts comprising panels displaying a portion of a visual scene, each panel in the plurality of panel inserts comprising edges that slide into and fit with respect to the continuous channel, and
   (c) at least one trim edge having a length similar to at least one portion of the continuous channel, such that once the single panel insert has been selected and inserted into the continuous channel, the trim edge is located along an edge of the single selected panel insert and secures the panel insert in place, completing the continuous channel and preventing edges of the panel insert from being exposed, wherein the portions of a visual scene of each panel insert in the plurality of panel inserts collectively form a visual effect across a plurality of aircraft galley components.

2. The panel insert system of claim 1, where in the at least one trim edge provides a picture frame look to the receiving surface by covering edges of the panel insert.

3. The panel insert system of claim 1, where in the at least one trim edge snaps into place.

4. The panel insert system of claim 1, wherein each panel insert in the plurality of panel inserts provides a releasable and interchangeable securing system.

5. The panel insert system of claim 1, wherein the receiving surface comprises a galley component door.

6. The panel insert system of claim 1, wherein the receiving surface comprises a storage cabinet door, a lavatory door, an overhead compartment door, a coat closet door, a cockpit door, a divider panel, a tray table, a seat back, or an exit row panel.

7. The panel insert system of claim 1, wherein one of the first or second series of multiple panel inserts comprises a collective aesthetic quality that creates a billboard effect or mural.

8. The panel insert system of claim 1, wherein the trim edge is integrally formed on a fourth edge of each panel.

9. The panel insert system of claim 1, wherein the trim edge is a separate component that is installed along an edge of the single selected panel insert without a channel after the panel insert has been positioned.

10. A panel insert system for use on-board an aircraft galley, comprising:
    (a) a receiving surface comprising an aircraft galley component door having (i) a door handle area bordered by a first channel section and (ii) four edges with a second continuous channel around three of the edges, leaving one of the receiving surface edges without a channel;
    (b) a plurality of panel inserts comprising panels displaying a portion of a visual scene, wherein each panel in the plurality of panel inserts comprises (i) at least three edges that cooperate with the continuous channel around the three of the edges of the receiving surface (ii) and at least one cut-out portion configured to accommodate the component door handle area and configured to slide into the first channel section bordering the door handle area; and
    (c) at least one trim edge similar in length to the first channel section and the second continuous channel, such that when positioned along the receiving end without a channel, the trim edge secures a single panel insert in place with respect to the receiving surface, preventing edges of the panel insert from being exposed, wherein the portions of a visual scene of each panel insert in the plurality of panel inserts collectively form a visual effect across a plurality of aircraft galley component doors.

11. The panel insert system of claim 10, where in the at least one trim edge provides a picture frame look to the receiving surface by covering edges of the panel insert.

12. A panel system for use in an aircraft galley for providing a billboard effect across a plurality of aircraft component receiving surfaces, the system comprising: an aircraft galley door component comprising a receiving surface; and
    a plurality of panel inserts that comprises panels displaying a portion of a visual scene, wherein each panel in the plurality of panel inserts is configured to be removeably secured to the aircraft galley component door receiving surface via a continuous channel along three sides of the receiving surface and a trim edge similar in geometry to the continuous channel for positioning along a fourth side of the receiving surface, the trim edge aligned with a non-channeled side edge of the aircraft component once the panel has been positioned, preventing edges of a single panel selected for positioning on the aircraft component from being exposed, wherein the portions of a visual scene of each panel insert in the plurality of panel inserts collectively form a visual effect across a plurality of aircraft galley component door receiving surfaces.

13. The panel insert system of claim 12, wherein the plurality of panel inserts comprise separate portions of a mural that when positioned, collectively form a mural across two or more aircraft component receiving surfaces.

14. An aircraft galley component door configured to receive a single removable panel insert, the aircraft galley component door comprising four edges with a continuous channel along three of the four edges, the continuous channel configured to cooperate with a corresponding panel edge on a panel insert, the trim edge preventing edges of the single panel from being exposed, wherein multiple aircraft galley component doors are aligned in the aircraft galley; and
    a plurality of panel inserts, each panel insert displaying a portion of a visual scene, such that the portions of a visual scene of each panel insert in the plurality of panel inserts collectively form a visual effect across a plurality of aircraft galley component receiving surfaces.

* * * * *